United States Patent [19]

Ellingsen et al.

[11] 3,920,261
[45] Nov. 18, 1975

[54] TORSION BAR STEERABLE BOGIE SUSPENSION

[75] Inventors: Svein Ellingsen, Kirkland; Allan D. McLean, Seattle, both of Wash.

[73] Assignee: Paccal Inc., Bellevue, Wash.

[22] Filed: July 5, 1974

[21] Appl. No.: 485,939

[52] U.S. Cl. ......... 280/81.5; 280/96.2 R; 280/124 B
[51] Int. Cl.² .................................... B60G 11/20
[58] Field of Search ........... 280/81.5, 96.2 R, 124 B

[56] References Cited
UNITED STATES PATENTS

| | | | |
|---|---|---|---|
| 3,002,762 | 10/1961 | Scheel | 280/91 X |
| 3,183,018 | 5/1965 | Holmstrom | 280/124 B |
| 3,454,123 | 7/1969 | Lewis | 280/81.5 X |

*Primary Examiner*—Philip Goodman
*Attorney, Agent, or Firm*—Seed, Berry, Vernon & Baynham

[57] ABSTRACT

Four or more wheels of a steerable bogie are torsionally sprung to the frame of the vehicle. Tire sideslip of one set of tires is reduced during steering of the other set by lateral movement of the tracking set.

5 Claims, 5 Drawing Figures

TORSION BAR STEERABLE BOGIE SUSPENSION

BACKGROUND OF THE INVENTION

1. Field of the Invention

This invention pertains to steerable, double-axle bogie units for rubber-tired trucks.

2. Description of the Prior Art

Both steerable double-axle bogies and non-steerable double-axle bogies with torsion rod suspension have been known heretofore. Steerable double-axle bogies on trucks with leaf-spring suspension have not had a satisfactory driver "feel," that is, the subjective handling characteristic that a driver describes as feel, and have frequently resulted in excessive tire wear because the manufacturing tolerances in the steering linkage coupling all four wheels of the double axle have precluded all four wheels turning about the exact same center of rotation.

SUMMARY OF THE INVENTION

It is an object of this invention to provide a steerable double-axle bogie which has a minimum amount of tire wear due to tire slip.

It is another object of this invention to provide a steerable double-axle bogie that has a good steering response and has a good feel to the driver.

It is still another object of this invention to provide a steerable double-axle bogie that uniformly distributes the load over all four of the wheels.

Basically, these objects are obtained by providing steerable wheels on forward and rearward axles at the forward end of the vehicle frame, providing means for simultaneously steering all of the wheels, and providing torsion rod spring means and suitable linkage means for actuating the torsion rods of the spring means to allow limited relative lateral movement between the forward and rearward axles so that lateral forces acting on the tracking set of steered wheels will be able to shift laterally to avoid tire slip and resultant wear. By relieving the forces normally causing tire slip on the tracking set of steered wheels, the life of the tires is, of course, increased. Another advantage resulting, however, is that of giving the vehicle a better feel during steering. Still another advantage is that the lateral motion provided by the independent torsion suspension of the axles allows less expensive manufacturing tolerances in the steering linkages.

Still another advantage is that the system of torsionally suspending the ends of the axle independently allows for better weight distribution over all of the four wheels on the vehicle steerable end.

DETAILED DESCRIPTION OF THE PREFERRED EMBODIMENTS

Figure 1:
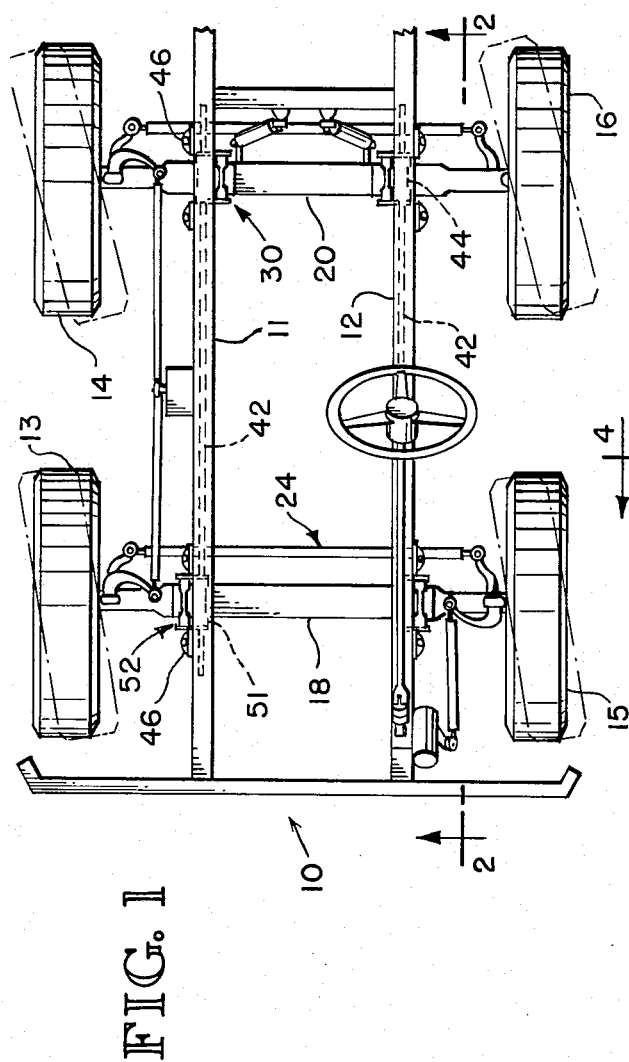
FIG. 1 is a fragmentary plan view of a forward end of a vehicle frame and steerable suspension of a rubber-tired vehicle embodying the principles of the invention.
Figure 2:
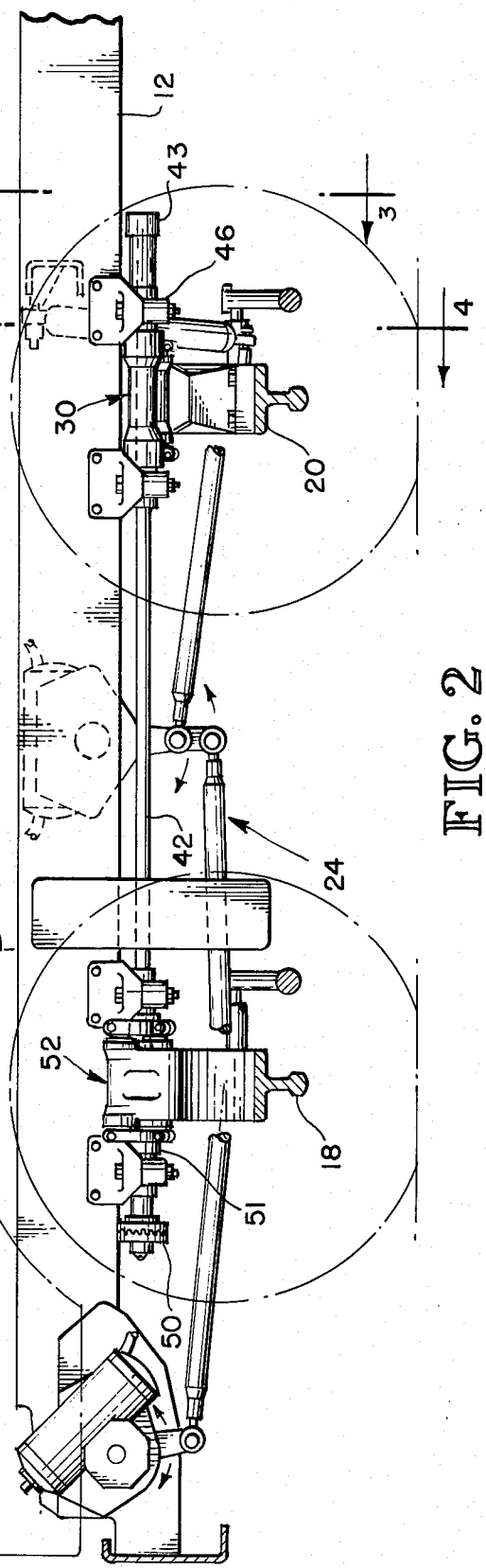
FIG. 2 is a fragmentary vertical section taken along the line 2—2 of FIG. 1.

As best shown in FIGS. 1 and 2, the steerable end, generally the front end 10, of a vehicle is illustrated and includes a pair of longitudinal frame members 11 and 12 running along the length of the vehicle. Four rubber-tired wheels 13, 14, 15 and 16 are mounted on forward and rearward axles 18 and 20, respectively. The wheels are conventionally mounted on kingpins and employ a conventional four-wheel steering mechanism 24. The details of the steering mechanism are well known. It is inherent in this type of conventional steering system that the four wheels cannot turn exactly along the same turning radius due to tolerance errors in the linkages of the mechanism 24 during manufacture. As a result, the two controlling wheels, for example, wheels 13 and 15, will impose a lateral force along axle 18 that will be transmitted through frame members 11 and 12 and rear axle 20 which will result in a force causing tires 14 and 16 to slide slightly laterally during their turning movement.

Figure 3:
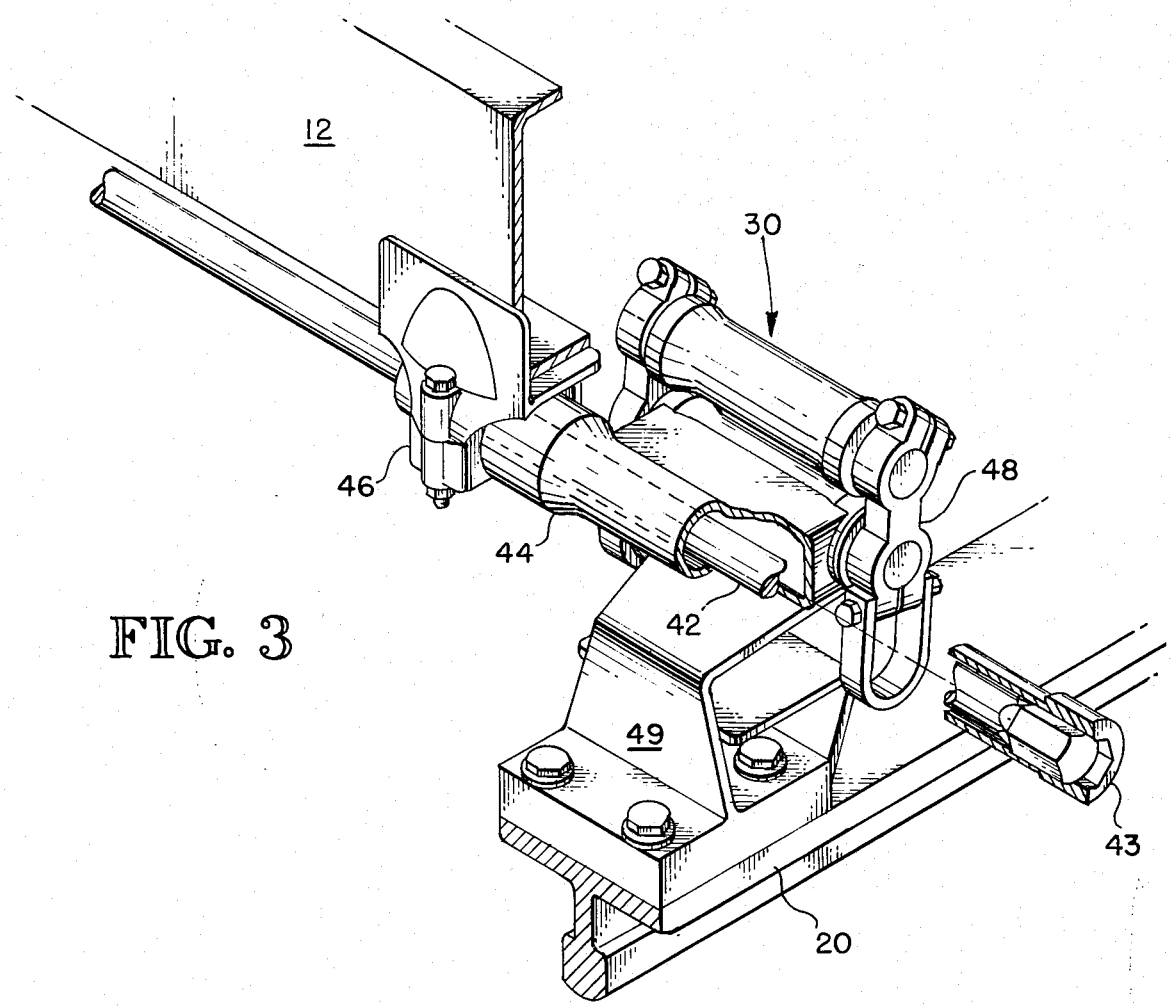
FIG. 3 is a fragmentary isometric taken along the direction of the arrows 3—3 in FIG. 2 and looking in at the rear left-hand suspension unit of the bogie.
Figure 4:
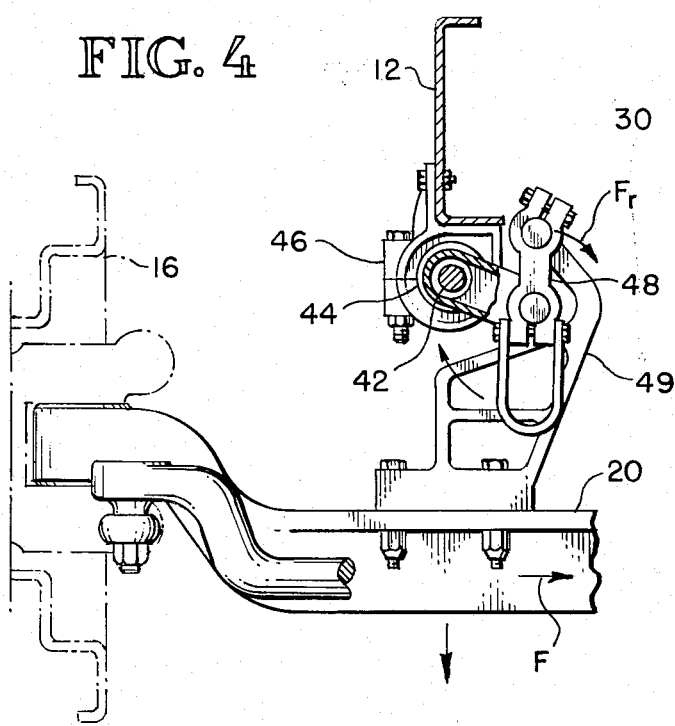
FIGS. 4 and 5 are operational vertical sections taken along the line 5—5 of FIG. 2 and illustrating the suspension in a retracted and an extended condition.

It is the purpose of this invention, in part, to allow for lateral movement of the rearward axle or tracking axle so that the tires may move slightly laterally rather than be slid over the road surface. For this purpose, each of the axles is mounted to the frames by torsion rod spring means 30, as best shown in FIG. 3. The torsion rod spring means includes a torsion bar 42 that is locked at one end in a socket 43 of a torsion crank 44. The torsion crank is rotatably secured to the frame by a spherical bearing 46. The opposite end of the torsion crank is pivotally mounted to a shackle link 48 which, in turn, is pivotally mounted at its free end to a perch 49. The perch 49 is bolted to the axle 20, as shown in FIG. 4. As is well known, vertical movement of the axle relative to the side frame is permitted by the controlled springing of the torsion bar 42.

The springing of the torsion bar is achieved by locking the forward end in an adjustable socket 50 (FIG. 2) secured to the torsion crank 51 of a torsion rod suspension 52, identical to suspension 30. In order to reverse the direction of twist on the torsion bar between the forward torsion rod suspension 52 and the rearward suspension 30, the torsion cranks 51 and 44 are oppositely directed at the forward and rearward axles 18 and 20, as is best shown in FIG. 1. Thus, looking at FIG. 5, for example, the torsion rod 42 receives a clockwise twist as the axle 20 moves away from frame 12, whereas, again looking in the direction of FIG. 5, movement of axle 18 away from frame member 12 will provide a counterclockwise twist in the rod 42.

Figure 5:
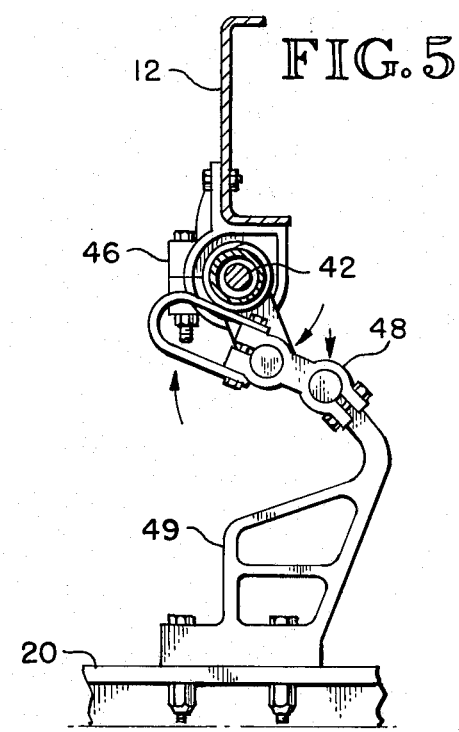

As best shown in FIG. 5, a force F on the axle 20 imposed through the tires during turning of the wheels, due to the tolerance errors in the steering mechanism 24, is not rigidly resisted, but rather, transmits this force through the perch 49, shackle link 48 and ultimately to the torsion rod 42. The force F provides a reaction force Fr which is of sufficient magnitude to rotate the shackle link slightly to allow limited lateral movement of the axle 20, thus allowing the wheel 16 to track in a path that follows the turning radius of the forward wheels. Since the motion is taken in the shackle link 48, springing between the axle 20 and the frame 12 is not substantially effected, thus allowing the torsion rod spring suspension to continue in operation during the turning operation.

While the preferred embodiment of the invention has been illustrated and described, it should be understood that variations will be apparent to one skilled in the art without departing from the principles herein. Accordingly, the invention is not to be limited to the specific embodiment illustrated.

The embodiments of the invention in which a particular property or privilege is claimed are defined as follows 1. A steerable double-axle bogie for a rubber tire vehicle having a frame, forward and rear axles on the forward end of the frame, at least two rubber tire wheels on each axle, and means for steering the wheels simultaneously, the improvement comprising torsion rod spring means for resiliently connecting each of the axles to the frame, said torsion rod spring means including torsion rods and linkage means for actuating said torsion rods, said actuating linkage means providing limited relative lateral movement between the frame and each axle and thus between the forward and rearward axles to compensate for side forces on the tires due to tolerance errors in the steering geometry, said actuating linkages each including a torsion crank, a shackle link and an axle perch, said torsion crank being locked to said torsion rod at one end and pivotally secured to said shackle link at the opposite end, said perch being rigidly secured to an axle and pivotally secured to the free end of said shackle link and wherein vertical and lateral movement of said axle pivots said torsion crank for springing.

2. A steerable double-axle bogie for a rubber tire vehicle having a frame, forward and rear axles on the forward end of the frame, at least two rubber tire wheels on each axle, and means for steering the wheels simultaneously, the improvement comprising torsion rod spring means for resiliently connecting each of the axles to the frame, said torsion rod spring means including torsion rods and linkage means for actuating said torsion rods, said actuating linkage means providing limited relative lateral movement between the frame and each axle and thus between the forward and rearward axles to compensate for side forces on the tires due to tolerance errors in the steering geometry, said torsion bar having one end locked to the actuating linkage of a forward axle on one side of the vehicle and a rearward end locked to the actuating linkage of a rearward axle on the same side of said vehicle, said actuating linkages being connected to the common torsion rod for twisting the rod in opposite directions with vertical movement of the wheels in the same direction for balancing loads between the forward and rearward wheels.

3. The bogie of claim 1, said means for steering the wheels including kingpins for pivotally mounting the wheels on the axles and steering links for simultaneously turning all four wheels about a center or rotation.

4. The bogie of claim 2, said means for steering the wheels including kingpins for pivotally mounting the wheels on the axles and steering links for simultaneously turning all four wheels about a center of rotation.

5. The bogie of claim 4, said actuating linkages each including a torsion crank, a shackle link and an axle perch, said torsion crank being locked to said torsion rod at one end and pivotally secured to said shackle link at the opposite end, said perch being rigidly secured to an axle and pivotally secured to the free end of said shackle link and wherein vertical and alteral movement of said axle pivots said torsion crank for springing.

* * * * *